Dec. 21, 1965   L. R. WOODS   3,224,255
OSCILLATING VIBRATION TABLE WITH AIR CENTER
Filed Sept. 19, 1958                                2 Sheets-Sheet 1

LEROY R. WOODS
INVENTOR.

BY Beehler & Shanahan
ATTORNEYS

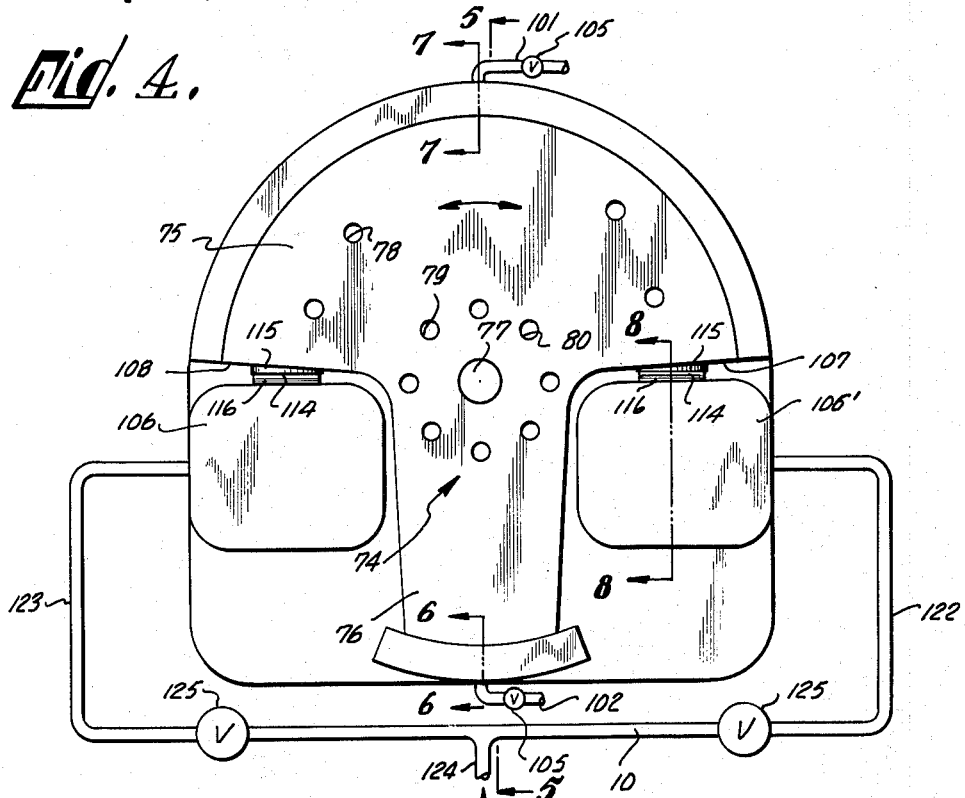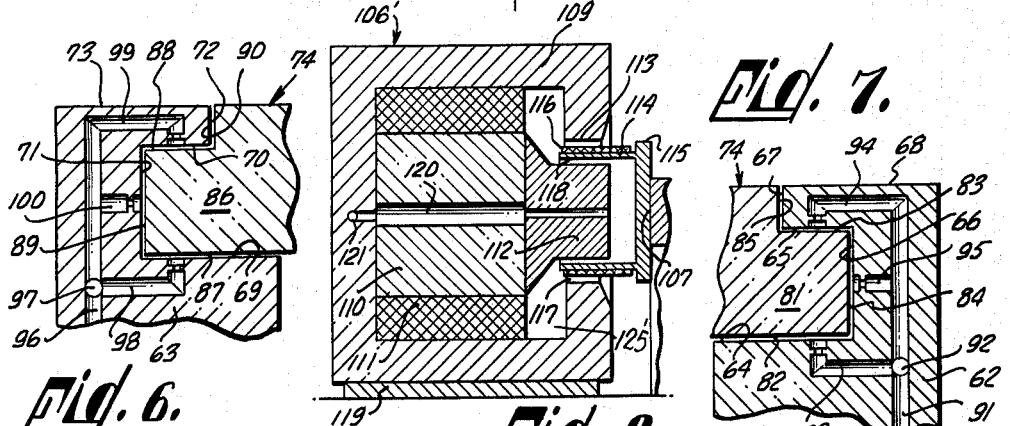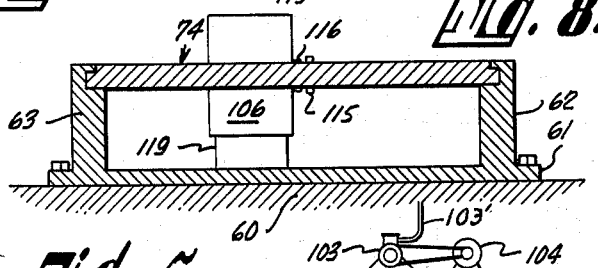

United States Patent Office 3,224,255
Patented Dec. 21, 1965

3,224,255
OSCILLATING VIBRATION TABLE WITH
AIR CENTER
Leroy R. Woods, Pasadena, Calif., assignor, by mesne assignments, to International Telephone and Telegraph Corporation, New York, N.Y., a corporation of Maryland
Filed Sept. 19, 1958, Ser. No. 762,086
10 Claims. (Cl. 73—71.6)

The invention herein concerned is a continuation-in-part of co-pending application Serial No. 527,077, filed August 8, 1955, which issued on December 2, 1958 as United States Patent No. 2,862,385 and was subsequently re-issued as United States Patent No. Re. 24,816.

The invention relates to test equipment and has special reference to what is commonly designated as a vibration table wherein parts to be tested are subjected to controlled periods of vibration in order to determine certain characteristics of the device which might be affected by comparable conditions in actual use. The vibration table or platform here concerned is one of a reciprocating character which rides on a virtually friction-free float and which has a to and fro motion, whether in a straight line or in a circumferential direction.

As precision type equipment has been called upon to meet higher and higher performance requirements, industry has been compelled to subject components to far more rigid performance requirements than heretofore has been necessary. Although in virtually all instances where such equipment has been produced and distributed to users test specimens have been subjected to simulated performance tests frequently in excess of the actual requirements in the field, test equipment which has been available has been limited to a rather material degree such that many operating conditions could not be simulated in a test environment. Shake tables have been a common expedient wherein mechanical vibrations have been made use of within a certain limited range. These shake tables, however, because of their mechanical and physical nature have been incapable of high frequency vibration to such an extent that even when components have been subjected to the most rigorous tests available, the resulting data has been inconclusive of the performance of the components when subjected to performance environments where the vibration frequency has been three, four, and five times greater than the greatest frequency made use of during the testing.

Even when the requirement for high frequency test vibrations is not beyond the ability of the shake table or other vibration device to meet, the expedients heretofore employed have not found an adequate mechanical testing platform capable of a rotary type of oscillation at either high frequencies or even at moderate frequencies.

Another impediment has been the absence of means for mounting the vibrating table or platform in such fashion that it could respond freely to the needed high frequency vibrations over periods of time long enough to produce the needed test environment.

It is therefore among the objects of the invention to provide a new and improved vibration table or platform capable of producing a to and fro vibration movement for periods of time sufficient to give dependable test results at the desired frequency.

Another object of the invention is to provide a new and improved vibration table or platform wherein the table to which specimens are attached is supported by a fluid under pressure whereby to reduce frictional resistance to vibration to virtually a minimum amount.

Still another object of the invention is to provide a new and improved vibration table wherein a source of the vibration is directed against opposite points on the table in an alternating sequence, thereby to produce a dependable vibration effect in a to and fro motion.

Still another object of the invention is to provide a new and improved vibration table which can be depended upon to produce effective, well-controlled vibration in a circumferential or oscillatory direction and throughout a range of frequencies far wider than those heretofore possible.

Still another object of the invention is to provide a new and improved vibration platform so constructed that it is adapted to ride upon a pressure fluid and which is capable of making use of the same fluid or some other fluid under pressure as a means of centering the table endwise with respect to sources of vibration.

A further object of the invention is to provide a new and improved vibration table wherein the amplitude and frequency of vibration can be controlled and changed by electronic means and which is also of such simple construction and design as to be capable of accurate and dependable results without necessitating exceptional skill in the handling.

It is further among the objects of the invention to provide a new and improved vibration table having the characteristics hereinabove recited which at the same time is relatively simple in its design and construction and inexpensive to manufacture and use.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

FIGURE 4 is a plan view of a modified form of table for producing oscillatory vibrations alternating in a circumferential direction.

FIGURE 5 is a longitudinal sectional view of the form of invention illustrated in FIGURE 4.

FIGURE 6 is a fragmentary cross-sectional view taken on the line 6—6 of FIGURE 4.

FIGURE 7 is a fragmentary cross-sectional view taken on the line 7—7 of FIGURE 4.

FIGURE 8 is a vertical sectional view taken on the line 8—8 of FIGURE 4.

Figure 1:
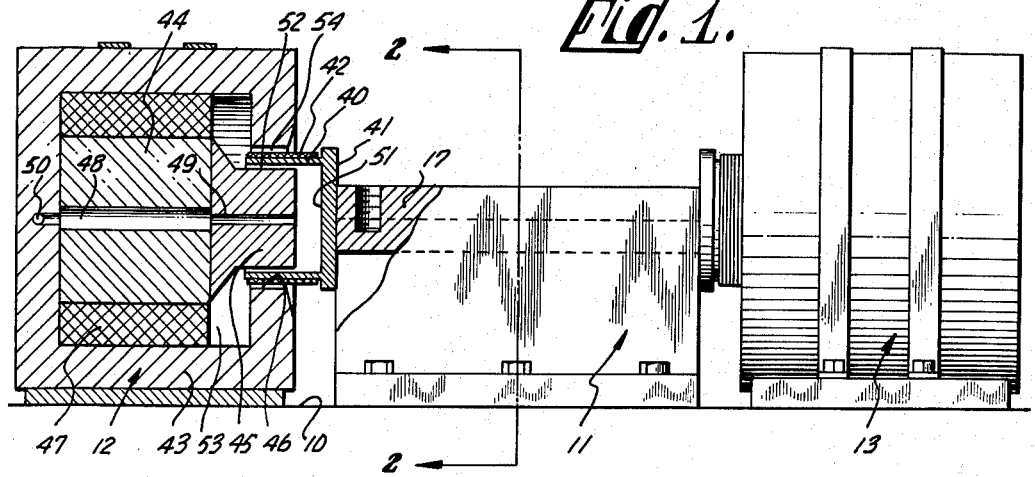
FIGURE 1 is a side elevational view partially broken away showing one form of the device and in particular the motivating vibrating force.

In an embodiment of the invention chosen for the purpose of illustration there is shown mounted upon a suitable sub-base 10 a vibration table assembly indicated generally by the reference character 11 in a position adapted to be operated by appropriate vibrator assemblies 12 and 13. In this form the table assembly is constructed upon a base 14 which may be bolted down to the sub-base 10 by suitable bolts 15. Extending above the base, which may be described as a frame, are columns 16 and 16'. At the upper end of the columns which may be of any convenient height is mounted a platform 17 of appreciable thickness having an upper surface 18 provided with threaded mounting apertures 19 or other equivalent means for the attachment of appropriate specimens adapted to be tested. The platform is designed to be carried by the columns in preferably a horizontal plane where it is supported with respect to the columns by a film of fluid under pressure. Most commonly the fluid is air under a pressure somewhat above atmospheric where the table is to be operated in open air sufficient that there is a pressure differential between the air which supports the table and the surrounding atmosphere. It is to be understood, however, that gaseous materials other than air may be suitable and that under those circumstances where the apparatus might be mounted in a closed chamber, the fluid pressures might be at amounts considerably different from atmospheric but wherein the differential pressure between the surrounding fluid and the fluid supplied will be sufficient to support the platform on the columns. Fluids of other natures and characteristics capable of maintaining the pressure differential may also be suitable.

In order that the platform may be carried by the columns in a substantially horizontal plane, there is shown in the chosen embodiment a longitudinally extending recess in each column defined by inside walls comprising a lower shoulder 20, an upper shoulder 21, and a bottom or rear face 22. The shoulders are in spaced parallel relationship, the upper shoulder being somewhat narrower than the lower shoulder and having a vertical step 23 adjacent thereto. The recesses thus formed are located in the mutually facing inside surface portions of the columns.

Fitting within the recesses on the respectively opposite sides of the platform are projections 24 defined by a lower face 25, an upper face 26, and an end face 27 in each instance. A vertical face 28 lies adjacent the step 23. Thus, the side surfaces of the platform and their proximate columns respectively form two opposed sets of intermeshing portions, each such set comprising a projection 24 of a platform side portion which extends into or meshes in a recess of a column. It should be understood and appreciated that the projections 24 have a size such that they are slightly smaller than the recesses which receive them sufficient to provide a clearance or gap between opposing faces of very narrow breadth which may be as small as .0001 of an inch to .001 of an inch or slightly greater, depending upon the size and weight of the platform which is being supported. Substantially the same or greater clearance will prevail between the step 23 and the face 28 opposite it.

Figure 2:
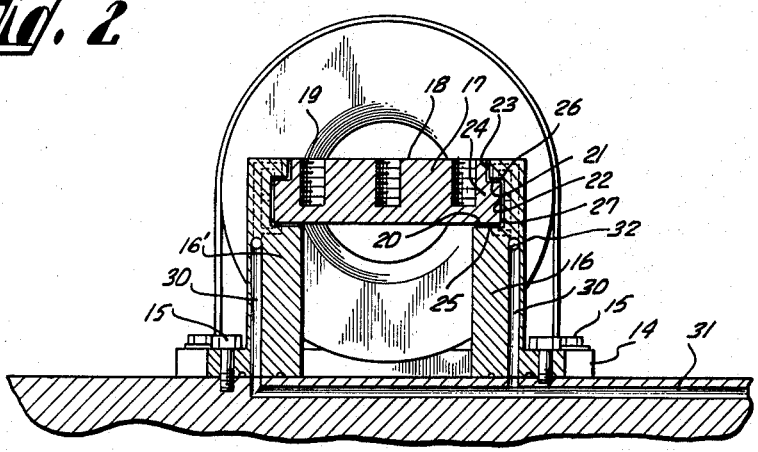
FIGURE 2 is a cross-sectional view taken on the line 2—2 of FIGURE 1.
Figure 3:
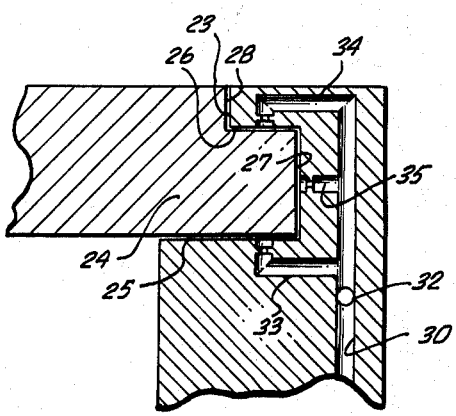
FIGURE 3 is a fragmentary cross-sectional view of the supporting track for the table drawn to a larger scale.

When the platform is in a non-operating or rest position, the platform rests upon the lower shoulders 20 of the recess. From its rest position, the platform is moved upwardly to an operating position in which the lower faces 25 of the platform projections are spaced above the shoulders 20 of the recesses to provide the above mentioned clearances. For purposes of convenience in referring to the relative positions of the platform with respect to the base to distinguish between the lowered rest position of the platform and the elevated vibrating or operating position of the platform, the base may be said to have a reference plane defined by the lower shoulders 20 of the two columns. In FIGURES 2 and 3 of the drawings the platform is shown disposed in its operating position spaced above said reference plane 20—20.

To suspend or float the table on the columns there is provided in each column a passageway 30 within the column which is supplied by a common passageway 31 in the sub-base, there being provided suitable conventional connections between the passages respectively in the sub-base and the base to assure a positive air-tight or fluid-tight connection. The passageway in each instance may be provided with as many branch lines 32 as necessary in order to reach appropriate spaced locations in the recess. Each branch line 32 supplies a lower branch 33, an upper branch 34, and an intermediate branch 35, each of which in turn communicates with an appropriate portion of the clearance or gap between the projection 24 and the recess in the column, if that arrangement be employed. It will be understood, however, that although the recess is here shown in the column structure and the projection in the platform structure, the same end result may be accomplished by a reversal of the described relationship.

When gas or other fluid is supplied under pressure to the passageways 31 and 30 where the pressure is greater than the pressure which surrounds the table assembly embodied in the platform, pressure will be built up in the gap between appropriate surfaces sufficient to float the platform clear of the columns on all sides so that the platform rides upon the fluid under pressure. The pressure differential will of course vary, depending upon the load to be supported, the character of the fluid, and other immediate conditions, depending upon the particular installation encountered. The fluid under pressure after passing from the gap will find its way into the space surrounding the device and may either be dissipated into the surrounding atmosphere or, if desired, recaptured and reused.

The source of vibration for the platform is provided by the vibrator assemblies previously identified, these being oscillation motors which are identical except for being motivated in alternating sequence. For each motor there is a stator and an armature which is movable in an axial direction alternately in directions into and out from the stator. For the illustrated embodiment the stator is a magnet (elements 43, 44, 45, and 47) which supplies a magnetic field within which lies the armature. The armature comprises a coil 42 wrapped on a coil support or collar 40 supported upon a disc 41 integrally attached to the platform 17. Coil 42 of wire is designed to be connected to a suitable source of alternating current in an alternating phase relationship to the comparable coil at the opposite end of the table.

Although any magnetic field may be made use of, there is shown in the chosen embodiment an electromagnet having a core consisting of a ring-shaped pole piece 43 and a central pole piece 44, there being provided a projection 45 on the central pole piece extending within an aperture 46 in the pole piece 43 and spaced therefrom to form an annular recess of sufficient breadth to accommodate the collar 40 and coil 42 wound therearound. A magnetic coil 47 when energized sets up a magnetic field across the pole piece to which the coil 42 is responsive when energized, thereby to produce a vibrating impulse adapted to give the platform a to and fro motion at any selected frequency of vibration from 10 cycles to about 15,000 cycles. The amplitude of vibration may be from a few thousandths of an inch up to as much as three inches, depending upon the operation and the clearance provided between the discs 41 and the ends of the immediately opposite projections 45.

Although mention is made of alternating sequences as a means of securing the to and fro movement, it should be understood that this may be accomplished by various agencies as for example by applying force to the magnets simultaneously in opposite directions or applying alternating forces in the same direction or by comparable application of energy, the net effect of which is to induce a reciprocating motion.

Inasmuch as when a platform like the platform 17 is floated upon a fluid such as air under pressure it will shift very readily toward whichever end of the platform might be heaviest, and some means is advisable in order to center the platform between opposite ends after the platform is loaded for a test. Compressed air or other fluid under pressure may be used in centering by a system wherein there is provided a bore 48 which in this example is centrally located within the pole piece 44 communicating with a bore 49 in the projection 45. These bores provide a continuous passage through the magnet supplied by a supply passage 50. The coil support 40, 41 is cup-shaped, the face 51 of the disc 41 being the bottom of the inside or recess of such cup shaped structure and the projection 45 extends into and is spaced within the inside walls of collar 40 and bottom face 51. Fluid under pressure in the bores is adapted to be driven against the bottom surface 51 of the recess of the coil support, after which its energy having been expended, the fluid can find its way through an annular recess 52 into a chamber 53 within the magnet and thence outwardly through an annular recess 54. Under those circumstances wherein the load on the platform is unbalanced between opposite ends to any appreciable degree, the pressures of fluid passing through the bores at opposite ends may be adjusted one greater than the other by appropriate conventional means in order to balance the table between opposite ends making certain that the full amplitude of vibration may be experienced without the table striking one end or the other.

On those occasions where an oscillating type of vibrating motion may be desired, a vibration table like that illustrated in FIGURES 4 through 8, inclusive, may be employed. To accomplish this there is mounted upon a sub-base 60 a base 61 which supports a column 62 at one end and a column 63 at the other. In the column 62 is an arcuate recess of slightly less than 180° formed by a lower shoulder 64, an upper shoulder 65, and a bottom or rear face 66. The upper shoulder is of lesser breadth than the lower shoulder and a step 67 extends between the upper shoulder and a top 68 of the column. At the opposite side the column 63 is provided with a similar arcuate recess substantially shorter than the first identified recess which is formed by a lower shoulder 69, an upper shoulder 70 of lesser breadth, and a bottom or rear face 71. In this instance also a step 72 extends between the upper shoulder 70 and a top 73 of the column.

A platform of somewhat composite form indicated generally by the reference character 74 has a large segment 75 on one side counterbalanced by a smaller segment 76 on the opposite side. The recesses in the columns are so located that the segments 75 and 76 oscillate or vibrate in a to and fro motion about a center of oscillation 77. The platform is provided with suitable apertures 78, 79, 80, etc., or other appropriate means of attaching thereto test specimens to be vibrated. There can be as many apertures and appropriate locations about the platform as may be needed in order to produce an appropriate vibration effect.

The segment 75 is contained within the recess in the column 62 by a projection 81 which consists of a lower face 82, an upper face 83, and an end face 84, there being provided also a shoulder 85 opposite the step 67. In the segment 74 there is provided a similar projection 86 formed from a lower face 87, an upper face 88, an end face 89, and a shoulder 90. The projections 81 and 86 are made slightly smaller than the appropriate recesses by a very narrow clearance providing a gap on opposite sides and ends of from about .0001 of an inch to gaps of .001 inch or slightly greater.

To float the segments comprising the platform, fluid under pressure is provided in each of the columns 62 and 63. In the column 62 is a passageway 91 communicating with a branch line 92 which supplies a series of branches comprising a lower branch 93, an upper branch 94, and an intermediate branch 95. Similarly, in the column 63 a passageway 96 supplies a branch line 97 if needed which in turn communicates with a lower branch 98, an upper branch 99, and an intermediate branch 100. Both of the passageways are supplied by fluid lines 101 and 102 connected by means of appropriate sealed fittings and which may be supplied by a common source such as a compressor 103 operated by a motor 104. Valves 105 may be used to adjust the pressure between opposite ends to assist in balancing any load which might be upon the platform or an unequal condition in the platform itself. A trunk line 103' under pressure from the compressor 103 is connected by conventional means (not shown) to the fluid lines 101 and 102.

In order to give the platform an oscillatory vibration there are provided two oscillation motors having stators or magnets 106 and 106' respectively on opposite sides of the segment 75. These magnets are located immediately adjacent respective end faces 107 and 108. The magnets are the same in all respects and a description therefore of one will suffice for both. Having reference to the magnet 106', the magnet is constructed of an outer pole piece 109 and an inner pole piece 110 around which is a coil 111 when an electromagnet is made use of. The pole piece 110 has a projection 112 extending within an aperture 113 in the outer pole piece and spaced from the aperture forming a relatively large annular recess. On the end face 107 of the segment 75 there is provided armature comprising a coil 116 a collar 114 and a disc 115 by means of which the collar is attached to the segment, the collar having the coil 116 of wire wrapped around it. The annular opening between the pole pieces is such that there is formed a relatively narrow outer annular space 117 outside the collar and an inner annular space 118 inside of the collar. When a magnetic field exists between the pole pieces, the supply of an electric current to the coil 116 will produce the required vibration effect upon the platform, depending upon the character of the current supplied to the coil 116. When this current is supplied to the collar at the opposite side in alternating phase relation, there will be created a push-pull motion in a circumferential or oscillatory direction upon the end faces 107 and 108, thereby creating an oscillatory vibration effect upon the platform, the frequency and magnitude of which may be varied at will by varying the exciting current in the coil 116. The magnets as shown may be anchored upon the base 61 by an appropriate pedestal 119.

When end centering is desired in this form of the invention, there may be provided a bore 120 through the appropriate pole piece 110 supplied by a fluid passage 121 which in turn is supplied by a fluid branch line 122 or 123 as the case may be, these branch lines being in communication with a common line 124 carrying fluid under pressure. Valves 125 are located in each of the branch lines in order that the pressure between opposite ends or end faces of the segments 75 can be balanced under varied conditions. The source of fluid pressure may be any common source of fluid pressure connected by conventional means to the trunk line 103' and the compressor 103.

When end centering is employed by the passage of fluid under pressure through the bore 120 the fluid finds its way first through the inner annular space 118 to an annular chamber 125' and thence through the outer annular space 117. An additional advantage in this type of end centering is the creation of a cooling effect upon the coils 116 by the passage of fluid, especially air or gas, in close proximity to the collar and the coil.

In use of this form of the invention specimens to be vibrated are fastened by appropriate conventional means to the platform 74 and after the platform has been floated by application of pressure to the recesses through the branches heretofore described, current is turned into the coils 116 and the platform vibrated to and fro in a circumferential direction. As previously mentioned, if the load is uneven, the platform can be balanced either by varying the pressure in the recesses on opposite sides or by varying the pressure through the pole pieces or both, depending upon the degree and character of unbalance.

As described in connection with both forms of the device there is preset a floating platform virtually friction-free which can be subjected to considerably varied vibration effects and which at the same time is the subject of a simple and rugged form of construction adaptable to a wide variety of test structures.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having thus described my invention, what I claim as new and desire to secure by Letters Patent is:

1. A vibration table comprising: a base structure; a platform structure supported by said base structure in a given plane for movement in said plane and having a work supporting portion thereon; one of said structures having recesses extending longitudinally in the direction of movement of said platform; the other of said structures having projections elongated in the direction of movement of said platform, said projections being parallel to said given plane and each said projection extending into a respective recess with an operative clearance on all sides of not more than a few thousandths of an inch; means for supplying fluid to the interior of said recesses at a pressure above the pressure surrounding the vibration table to float platform in a substantially friction free medium for movement in said given plane; means for vibrating said platform in the direction of movement comprising magnets, each said magnet being disposed at an end of said platform and having a central pole piece extending toward said platform with a bore therein, and a ring pole piece extending around said central pole piece; a vibration responsive armature on each of said platform disposed parallel to said given plane and comprising a coil support and a coil wrapped around said coil support, said coil support comprising a collar disposed around said central pole piece in spaced relation thereto; means for supplying fluid under pressure to said bores; and means for regulating the pressure of the fluid fed to said bores to center said platform structure between said magnets.

2. A vibration table comprising: a base; a column structure supported by said base; a rectangular platform supported in a given plane by said column structure for movement in said plane and having a work supporting portion thereon; one of said structures having recesses extending longitudinally in the direction of movement of said platform, each said recess comprising a lower shoulder disposed parallel to said given plane, an upper shoulder narrower than said lower shoulder and parallel thereto, a portion joining said shoulders disposed perpendicular to said shoulders, and a vertical step between said upper shoulder and the top of said column structure; the other of said structures having projections extending longtiudinally in the direction of movement of said platform on opposite sides of said structure, each said projection being complementary to and mounted within a respective recess so that an operative clearance of not more than a few thousandths of an inch may be maintained on all sides of said projections with respect to said recesses; means for supplying fluid to the interior of said recesses at a pressure above the pressure surrounding said table whereby said table may be floated in a substantially friction free medium; and means for vibrating said platform in the direction of movement comprising magnets, each said magnet being disposed at an end of said platform and having a central pole piece extending toward said platform with a bore therein, and a ring pole piece extending around said central pole piece; a vibration responsive armature on each end of said platform disposed parallel to said given plane and comprising a coil support and a coil wrapped around said coil support, said coil support comprising a collar disposed around said central pole piece in spaced relation thereto; means for supplying fluid under pressure to opposite ends of said platform through said bores; and valve means for regulating the pressure of the fluid fed to said bores to center said platform structure between said magnets.

3. A vibration machine comprising: a base having a reference plane; two spaced apart columns extending above said plane; a platform extending between said columns and being movable from a rest position upon said columns to an operating position spaced above said rest position, said platform comprising two opposite end portions and two opposite side portions; said columns comprising inside portions respectively facing towards each other, said side portions of said platform being proximate said inside portions of said columns respectively to define two sets of intermeshing proximate portions, each said set of intermeshing portions comprising a projection on one portion and inside walls defining a longitudinal recess in the other portion, each said recess being parallel to said plane, each said projection extending into the recess of its intermeshing set and being parallel to said plane, said recesses being open to the ambient space around said platform and of larger dimensions than said projections such that when said platform is moved to its operating position, that part of each projection which extends into said recesses will be spaced apart from the inside walls of said recesses by a fluid receiving clearance which is open to said ambient space; means defining fluid flow passageways open to said clearances for supplying fluid to said clearances at a pressure above that of said ambient space to float said platform in its operating position out of direct contact with said column for movement parallel to said plane; an oscillation motor for vibrating said platform parallel to said plane, said motor comprising a stator member and an armature member, said armature member being reciprocally movable with respect to said stator member in directions parallel to said plane and into and out of said stator members; one of said members being mounted on said platform, the other of said members being adapted to be mounted in a fixed position with respect to said base and spaced apart from said platform; said stator member having a recess formed therein; said armature member having a projection extending into and spaced within said formed recess of said stator member, said formed recess of said stator member being open to said ambient space; and means defining fluid flow passageways open to the space between said stator and said armature members for supplying fluid to within said formed recess of said stator member at a pressure above that of said ambient space to maintain said armature member in a desired relationship with respect to said stator member when said platform is in its operating position.

4. A vibration table comprising: a base structure; a platform structure; said platform structure having a work supporting area thereon; one of said structures having arc supports, the other of said structures having arc counter supports complementary to said arc supports for supporting oscillatory movement of said platform structure above a rotary axis, said arc supports and counter supports intermeshing to restrict movement of said platform structure to rotary oscillations about said rotary axis in a plane which is perpendicular to said rotary axis, said rotary axis being coincident with the center on which said arcs are drawn; means for providing a low coefficient of friction between said supports and said counter supports, and means for oscillating said platform in said given plane about said axis.

5. A vibration table comprising: a base; a platform structure; a supporting structure fixed to said base for supporting said platform structure for oscillatory movement about a rotary axis in a plane perpendicular to said rotary axis, one of said structures comprising arc-shaped supports, the other of said structures comprising arc-shaped counter supports, the arcs of said arc-shaped supports and counter supports being drawn on said rotary axis, said arc supports and counter supports intermeshing to confine movement of said platform structure to rotary oscillations about said rotary axis; and means for oscillating said platform in said plane about said rotary axis.

6. A vibration machine according to claim 3 wherein said projection of said armature member comprises a cup-shaped coil support member.

7. A vibration machine according to claim 3 in which said projections of said intermeshing sets are on the platform and said recesses of the intermeshing sets are in the columns.

8. A vibration machine according to claim 3 in which said platform is rectangular in plan, said projections of said intermeshing sets extend longitudinally of said side surfaces of the platform respectively, and said armature member is mounted on an end surface of the platform.

9. A vibration machine according to claim 3 in which the platform is oscillatory in a plane parallel to said reference plane and about an axis which is perpendicular to said reference plane, said side portions of the platform being arcs, one of said arcs being substantially larger than the other, said axis being the center on which said arcs are drawn, said end portions of the platform extending radially inward of the platform from the end respectively of said larger arc.

10. A vibration machine comprising a base having a reference plane and two spaced apart columns extending above said plane, a platform extending between the columns and being movable from a rest position upon said columns to an operating position spaced above said rest position and parallel thereto, the platform having two opposite end surfaces and two opposite side surface portions, the columns having inside portions respectively facing toward each other, said side portions of the platform being proximate said inside portions of the columns respectively to define two sets of intermeshing proximate portions, each set of intermeshing portions comprising a projection on one portion and inside walls defining a recess extending longitudinally parallel to said reference plane in the other portion, the projection extending longitudinally in the direction of said recess and into the recess, the recess being open to the ambient space around the platform, the recess being of larger dimensions than the projection such that when the platform is moved to its operating position, that part of the projection which extends into the recess will be spaced within the inside walls of the recess by a fluid-receiving clearance which is open to said ambient space, means defining fluid flow passageways open to said clearances for supplying fluid to the clearance at a pressure above that of said ambient space thereby to float the platform in its operating position out of direct contact with the columns upon the fluid in said clearances, the platform being oscillatory in a plane parallel to said reference plane and about an axis perpendicular to said reference plane, said sets of intermeshing portions extending along arcs with the arc of one set being substantially longer than that of the other set, said axis being the center on which said arcs are drawn, said end surfaces of the platform extending radially inward of the platform from the end respectively of said larger arc, and an oscillation motor for vibrating the platform in said plane parallel to said reference plane, the motor comprising a stator member and an armature member relatively movable with respect to the stator member alternately in directions into and out from the stator member within said plane parallel to said reference plane, one of said members being mounted on an end surface of the platform, the other of said members being adapted to be mounted in fixed relationship with respect to said base and spaced from the platform.

References Cited by the Examiner
UNITED STATES PATENTS

| | | |
|---|---|---|
| 1,883,277 | 10/1932 | Zerk. |
| 2,686,427 | 8/1954 | Ellett _____ 73—71.6 |
| 2,697,343 | 12/1954 | Hirtreiter _____ 73—71.6 X |
| 2,862,385 | 12/1958 | Woods _____ 73—71.6 |
| 2,929,254 | 3/1960 | Gustafson et al. ____ 297—75 X |

FOREIGN PATENTS

| | | |
|---|---|---|
| 992,803 | 7/1951 | France. |
| 376,834 | 11/1939 | Italy. |

OTHER REFERENCES

Societe Nationale de Constructions Aeronautiques du Sud-Est, France, 1,024,940.

RICHARD C. QUEISSER, *Primary Examiner.*

ROBERT L. EVANS, C. A. CUTTING, JOHN P. BEAUCHAMP, JOSEPH P. STRIZAK, *Examiners.*